United States Patent
Macchetti et al.

(10) Patent No.: US 8,683,224 B2
(45) Date of Patent: Mar. 25, 2014

(54) PROCESSOR-IMPLEMENTED METHOD FOR ENSURING SOFTWARE INTEGRITY

(75) Inventors: Marco Macchetti, Cheseaux-sur-Lausanne (CH); Henri Kudelski, Chexbres (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 631 days.

(21) Appl. No.: 12/801,891

(22) Filed: Jun. 30, 2010

(65) Prior Publication Data

US 2011/0022854 A1 Jan. 27, 2011

(30) Foreign Application Priority Data

Jul. 27, 2009 (EP) .................................... 09166439

(51) Int. Cl.
*G06F 21/00* (2013.01)
(52) U.S. Cl.
USPC ............... 713/190; 713/189; 380/44; 380/45
(58) Field of Classification Search
USPC ............................ 713/189–190; 380/44–45
See application file for complete search history.

(56) References Cited

U.S. PATENT DOCUMENTS

| | | | |
|---|---|---|---|
| 5,675,645 A | | 10/1997 | Schwartz |
| 6,061,449 A | * | 5/2000 | Candelore et al. ............... 380/28 |
| 6,351,539 B1 | * | 2/2002 | Djakovic ....................... 380/268 |
| 6,920,221 B1 | * | 7/2005 | Faber et al. ................... 380/200 |
| 7,068,786 B1 | * | 6/2006 | Graunke et al. ................. 380/44 |
| 7,287,166 B1 | * | 10/2007 | Chang et al. ................... 713/187 |
| 2004/0181772 A1 | | 9/2004 | Pensak |
| 2009/0006864 A1 | * | 1/2009 | Hashimoto et al. ........... 713/190 |

FOREIGN PATENT DOCUMENTS

| | | |
|---|---|---|
| EP | 0908810 | 3/2006 |
| WO | WO 2004/072891 | 8/2004 |

OTHER PUBLICATIONS

David Lie, Architectural Support for Copy and Tamper-Resistant Software, Dec. 2003, Retrieved from http://www-vlsi.stanford.edu/papers/djl_thesis.pdf, pp. 1-125.*
Ping Wang, Tamper Resistance for Software Protection, A Thesis for the Degree of Master of Science at the School of Engineering Information and Communications University, 2005, pp. 1-64.*

* cited by examiner

*Primary Examiner* — Chau Le
(74) *Attorney, Agent, or Firm* — Harness, Dickey & Pierce, P.L.C.

(57) ABSTRACT

The present invention provides a solution to the problem of guaranteeing the integrity of software programs by encrypting all or part of each instruction of a program using a key based on all or part of one or a plurality of previous instructions, thus resulting in a different encryption key per instruction. The invention is applicable to software programs whose structures are not necessarily tree-like in nature and is also applicable when the program includes loops, jumps, calls or breaks etc. The invention allows for an exception to be flagged when an encrypted instruction is wrongly decrypted. There is no need for the first instruction to be in clear, since the instruction key may be appropriately initialized as required. The invention can be realized in software or entirely in hardware thereby eliminating the possibility of a third party intercepting a decrypted instruction or a decryption key.

12 Claims, 2 Drawing Sheets

$INSTC = DEC(INSTC')_{KC}$
$INSTF = DEC(INSTF')_{KF}$
$KC = Fn(DIG2(KP), DIG1(INSTP))$
$KF = Fn(DIG2(KC), DIG1(INSTC))$

PROCESSOR-IMPLEMENTED METHOD FOR ENSURING SOFTWARE INTEGRITY

CROSS-REFERENCE TO RELATED APPLICATIONS

This application claims the benefit of priority under 35 U.S.C. §119 from European Patent Application No. 09166439.1, filed on Jul. 27, 2009, in the European Patent Office, the disclosure of which is incorporated herein in its entirety by reference.

INTRODUCTION

The present invention relates to the domain of software protection and more particularly to a device and a means for rendering software tamper-proof, thus ensuring the integrity of a piece of software.

STATE OF THE ART

In the domain of secure data processing, it is necessary to provide a tamper-resistant environment within which the processing can occur in a secure manner. A first approach to tackling the problem of application security was focused on endeavoring to render the hardware within which the software was housed as secure as possible. The notion of tamper-proof at that time meant that such hardware was difficult to open or once opened would destroy the chip on which the secure software resided. However, nowadays it is generally recognized that software techniques for achieving application security offer more flexibility and lower cost and indeed in most cases where good application security implies guaranteeing that a piece of software has not been tampered with, a combination of software and hardware approaches is used.

A typical system on which an application runs generally comprises a processing unit, a plurality of peripherals and memory. In most cases where security is required, encryption schemes are used. In such schemes, information which is required to be kept secure, i.e. working data or executable code, is encrypted. Encryption is usually done within a security module, which forms part of the system. The security module can be implemented in a variety of manners such as on a microprocessor card, on a smartcard or any electronic module in the form of a badge or key. These modules are generally portable and detachable from the receiver and are designed to be tamper-proof. The most commonly used form has electrical contacts, but contactless versions of type ISO 14443 also exist. Another implementation of the security module exists where it is directly soldered inside the receiver, a variation of this being a circuit on a socket or connector such as a SIM module. Yet another implementation is to have the security module integrated on a chip which has another function e.g. on a de-scrambling module or on a microprocessor module of a decoder. The security module can also be implemented in software.

In spite of the use of security modules and advanced encryption techniques in modern day secure processing systems, such systems still represent a significant attraction for attempts at breaching security. Techniques which have been used to breach the security of such systems include, for example, the reverse engineering of the hardware involved or the dynamic or static analysis of software used therein and the subsequent tampering with such software. By static analysis it is meant some form of disassembly or decompilation of non-executing code. By dynamic analysis it is meant analysing while the code is running, i.e. by observing certain signals while software is running. Such analyses may lead to tampering whereby the software is modified by, for example, performing a branch-jamming attack wherein an unconditional jump is introduced in place of a conditional jump thus forcing a branch to execute when the current conditions do not prescribe such execution. Typically, such an attack would force a programme to bypass an authentication step like serial number or password checking for example.

In a paper entitled "Tamper-Resistance for Software Protection", submitted in 2005 as a thesis for a degree of Master of Science, Ping Wang describes a technique of multi block encryption, wherein a software programme is divided into a number of independent blocks according to the flow of the programme. Each block of the programme is then encrypted, each block having a different encryption key. The encryption key for each block is the hash value of the preceding block according to the flow of the programme. This technique works in programmes which have a tree-like structure wherein the blocks are arranged in a hierarchical fashion with one block leading to another. In this technique, the first block to be executed must be in clear. A code to call the decryption routine is placed inside each of the blocks and a programme controller to implement the dynamic integrity checking is added to the end of the programme. If an adversary tries to change a part of the programme, then the hash value for the block containing the changed part of the programme will be different and so the next block will not be properly decrypted and the programme crashes.

This scheme has the disadvantage that each block therefore needs to be read twice. It has a further disadvantage in that the encryption is done on a block by block basis rather then an instruction by instruction basis, with one decryption key being valid for an entire block. This means that the discovery of one key leaves a complete block of software vulnerable. The size of the smallest possible block is determined by the smallest block completely containing a loop, since in this design, by definition, a block must contain the entirety of a loop. Even if a programme were able to be reduced to one instruction per block in the case that there were no loops, the resulting overhead in implementing the method would render the final result unwieldy in terms of size and speed of execution. Furthermore, one could imagine a possible attack wherein a modification could be made to a block and a corresponding change made to the programme controller to compensate for the modification in such a way that it calculates the proper hash value with respect to the modification made to the block thereby preserving the perceived integrity of the programme.

The present invention allows for the executable code to exist in encrypted format, the encryption being done on an instruction by instruction basis and not requiring that the instructions be read twice. The scheme can be realised entirely in hardware with the inherent advantage that the encryption keys never appear anywhere where they might be vulnerable to being intercepted. There is no software overhead and therefore speed of execution is greatly increased. In the prior art, the encryption key for the next block depended only on the contents of a preceding block. In the present invention the encryption key can depend on an accumulation of a number of preceding encryption key values. For example, the key to decrypt the next instruction could be based on the current instruction combined with an accumulation of the keys for the two previous instructions.

BRIEF SUMMARY OF THE INVENTION

The present invention aims to solve the problem of security caused through the analysis of software and the subsequent tampering of said software, while minimizing the overhead in order to achieve the solution and making it flexible and applicable to systems which use software of many different structure types. This is achieved using a processor-implemented method for ensuring the integrity of software in a programme memory, said software comprising a plurality of encrypted instructions, an instruction comprising at least an opcode, said method using an initialised instruction key and comprising the following steps:

reading a current encrypted instruction, using the instruction key to decrypt the current encrypted instruction, updating the instruction key using a calculation based on the current value of the instruction key and a digest of the current instruction, so that the next encrypted instruction to be read may be decrypted with the updated instruction key, executing the current instruction.

The invention can be applied to programmes whose structure is not necessarily tree-like in nature and may be realised in software or entirely in hardware thereby eliminating the possibility of a third party intercepting a decrypted instruction or a decryption key.

BRIEF DESCRIPTION OF THE DRAWINGS

The present invention will best be understood by referring to the following detailed description of preferred embodiments when read in conjunction with the accompanying drawings, wherein.

DETAILED DESCRIPTION

As mentioned above, the present invention aims to provide a means for running software in a secure manner whereby the software is stored in memory in encrypted form and decrypted and executed within a secure processor on an instruction by instruction basis, away from the possibility of being monitored. The key for the decryption of a current instruction depends on at least one previous instruction having been properly decoded, while the key for the decryption of a following instruction depends on the correct decryption of the current instruction. In this way, a self-checking means for guaranteeing the integrity of a piece of software is achieved. The mere successful execution of the software is a guarantee that neither the flow nor the content have been tampered with, since a modification made to one instruction would invalidate the ability to decrypt the following instruction, leading to premature termination of the programme or at least in a corruption of the programme execution trace. The scheme used in the present invention can be realised in software, but it is to be noted that it can be realised entirely in hardware, thereby removing the possibility of a third party intercepting instructions in clear or intercepting any of the decryption keys involved. The invention results in almost no overhead compared to solutions in the state of the art. The scheme can be applied to software of various different architectures or structures including those with jumps and breaks and is not limited to structures known as tree structures.

The present invention therefore provides a method for ensuring tamper-proof software execution in a system comprising at least a programme memory (PMEM) to hold encrypted programme instructions (INSTP', INSTC', INSTF'), a decryption module (DECR) to decrypt said programme instructions, a data processing unit (SCPU) to execute the decrypted programme instructions (INSTP, INSTC, INSTF) and a means to build decryption keys, known as instruction keys (KP, KC, KF), to decrypt the encrypted programme instructions. The means for building the instruction keys could of course reside within the data processing unit. The decryption module and the data processing unit are to reside preferably within a security module of any of the types which are well-known in the state of the art.

Figure 1:
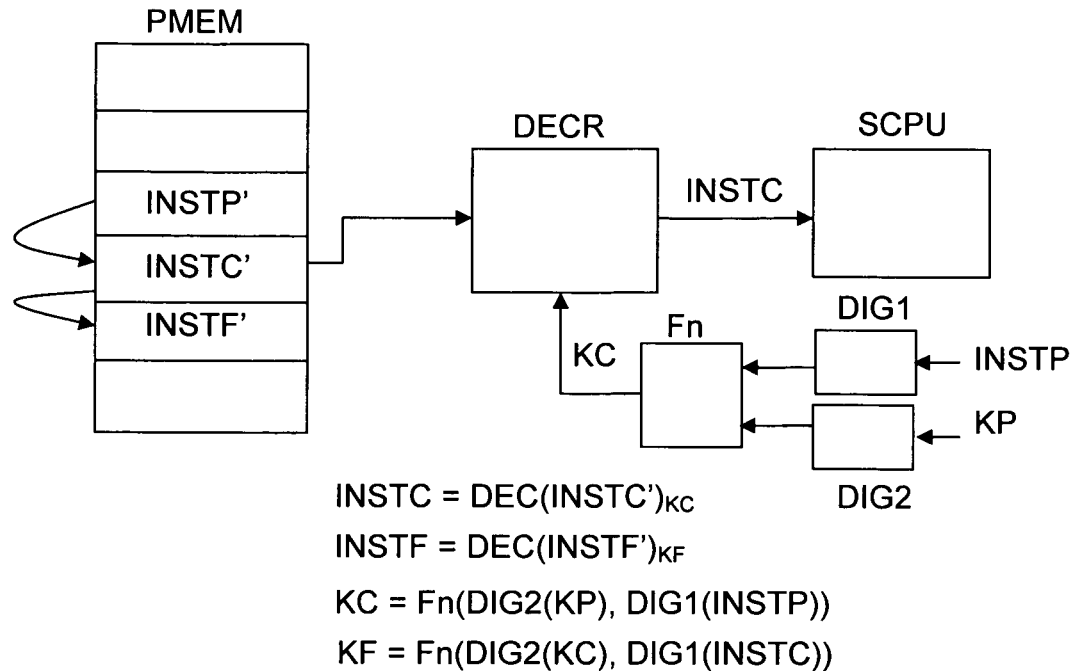
FIG. 1 is a simplified block diagram of an embodiment of the present invention.

During the execution of the encrypted program, the current encrypted instruction (INSTC') is read from the programme memory (PMEM) and is decrypted (DECR) to give a current instruction (INSTC) using a current decryption key (KC) which is built from a combination (Fn) of on one hand a digest of the previous decryption key (KP) and on the other hand a digest of the previously executed instruction (DIG(IN-STRP)), as shown in FIG. 1. By "digest" it is meant any operation applied to all or part of an operand and yielding an output. It is worth noting that the digest, when performed on an operand, may yield an output which is equal to the operand itself. According to one embodiment of the present invention the digest includes a one-way function on the operand. This allows for further hampering any attempt by a third party to work back and deduce previous keys or previous instructions. A hash function is an example of such a one-way function (SHA2, MD5 for example). By "combination" it is meant any form of combination of the mentioned operands whether it be logical or arithmetical or cryptographic. In this manner the flow and the content of the programme are guaranteed since if the current encrypted instruction is not the instruction which was intended by the creator of the programme, then the current decryption key (KC), when used to decrypt the current encrypted instruction, would yield some other, non-intended value. In this way we obtain a piece of software which verifies itself since the integrity of the software is guaranteed merely by virtue of its successful execution. If the software has been tampered with, then it will fail to execute.

Figure 2:
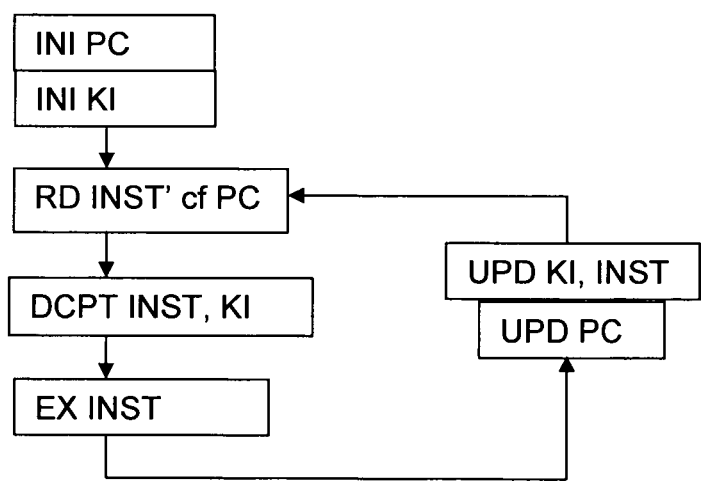
FIG. 2 shows a flow diagram of an embodiment of the present invention.

FIG. 2 shows a flow diagram representing the above embodiment of the present invention. This representation describes the invention from the point of view of a snapshot in time, rather than speaking of a current instruction with its current decryption key and a previous instruction with its previous key etc, it refers only to an instruction key (KI) which is updated as each instruction is executed. As is normal in any processing unit, a programme counter (PC) is used to indicate the location of the next instruction to be executed. The programme counter is incremented following the execution of an instruction or otherwise updated if said instruction dictates a different form of update other than a simple increment. For example, if an instruction involves a command to load a value from a register, then the programme counter will usually simply be incremented to indicate the following location. However, if the instruction involves a jump to a certain location, then the program counter will be updated with the value of the location indicated by the jump.

The programme counter (PC) and the instruction key (KI) are first initialised (INI PC, INI KI). An encrypted instruction is read from the programme memory at a location indicated by the programme counter (RD INST' c.f. PC) and decrypted using the instruction key (DCPT INST, KI). The instruction is executed (EX INST) and the programme counter is updated (UPD PC) either by a simple increment or by substituting a new value as dictated by the instruction. The instruction key is updated (UPD KI, INST) using a digest of the executed instruction. The updating of the instruction key therefore takes into account not only the instruction which has just been executed but also the value of the key which was used to decrypt the instruction. In turn, the instruction key which was previously used to decrypt the previous instruction was built from the previous instruction and the instruction key which was used to decrypt the instruction before that. In this way the value of the instruction key not only depends on the last executed instruction but on all previously executed instructions combined. In fact, in an embodiment of the present invention, the updating of the instruction key takes into account the value of the last executed instruction and the values of at least the two preceding executed instructions. For example the key for decrypting instruction 4 could be a combination of a digest of instruction 3, a digest of instruction 2 and a digest of instruction 1.

As shown in FIG. 2, the method of the present invention involves a loop wherein the instruction key is updated using the previously executed instruction. This leads to the question as to how to decrypt the first instruction in a programme. If there is no previously executed instruction, then how is the first instruction key calculated? In one embodiment of the present invention the first instruction in a programme is left in clear while all other instructions are encrypted. The first instruction is therefore executed directly, thereby beginning the loop, and the second instruction is decrypted using an instruction key based on the first instruction and so on. In another embodiment of the present invention the entire programme is encrypted, including the first instruction, and the instruction key is initialised using a value which will decrypt the first instruction. This value could be a master key which is built into the security module or otherwise communicated to the security module from outside.

Figure 3:
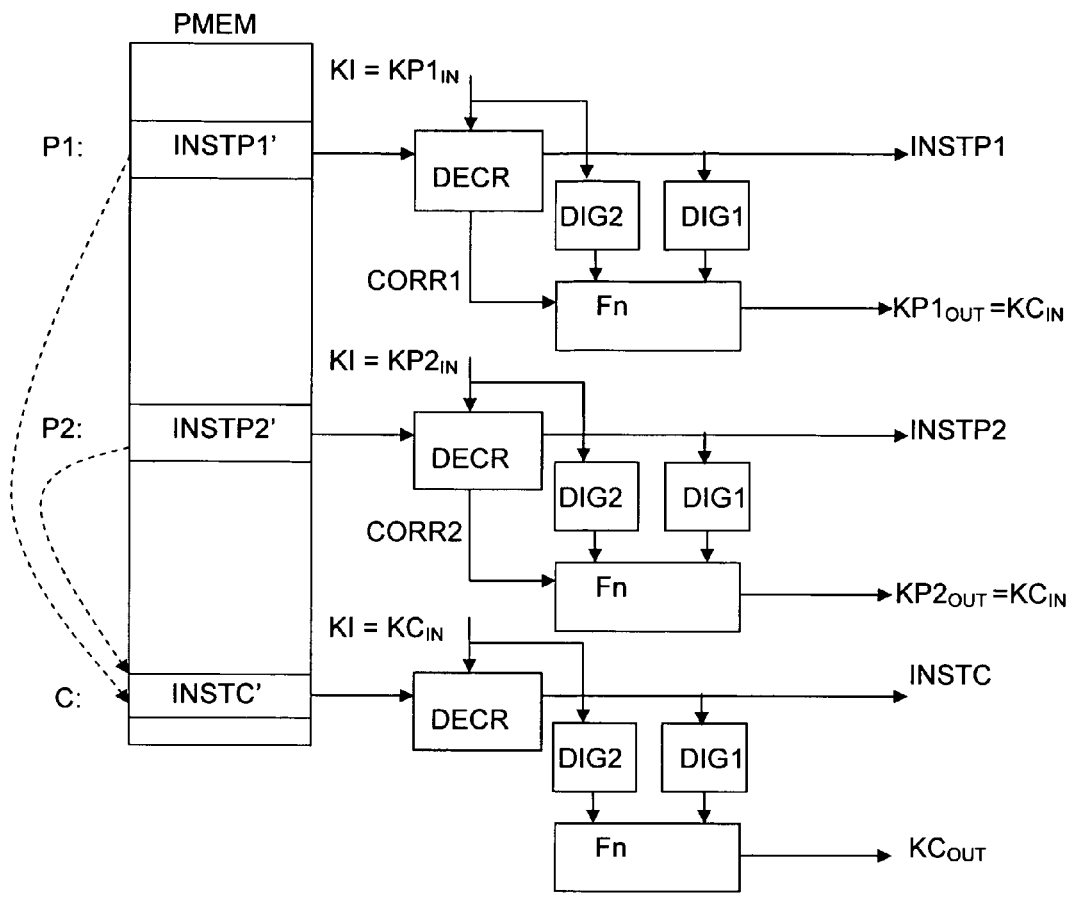
FIG. 3 is a simplified block diagram showing how software jumps or branches may be handled according to an embodiment of the present invention.

During the execution of a programme, circumstances can arise whereby a current instruction (INSTC'), residing at a current memory location (C) may be referenced by more than one previous instructions (INSTP1, INSTP2). In other words a current instruction, or callee, can be referenced by more than one caller, for example when a branch-type instruction (including jump, branch or call for example) is encountered. FIG. 3 illustrates a scenario wherein two callers (INSTP1, INSTP2) refer to one callee (INSTC). In this case, since two different values for the instruction key are possible in view of the different possible histories, this would lead to two different results depending on which of the keys would be used to decrypt the encrypted callee. This of course is not a desirable situation since the encrypted callee can only have been encrypted by one key. To avoid this problem, a modification (CORR1, CORR2) is made to the calculation in order to force the resulting instruction key to the required value to correctly decrypt the callee. For example, a callee resident at location C is referenced by two different callers resident at locations P1 and P2. The instruction key required to properly decrypt the encrypted instruction at location C (INSTC') is $KC_{IN}$. However, the value of the instruction key following the execution of the instruction resident at P1 (INSTP1) is $KP1_{OUT}$ and the value of the instruction key following the execution of the instruction resident at P2 (INSTP2) is $KP2_{OUT}$. Furthermore, it is reasonable to assume that $KP1_{OUT}$ is not equal to $KP2_{OUT}$ and that neither $KP1_{OUT}$ nor $KP2_{OUT}$ are equal to $KC_{IN}$. The method therefore requires that a modification (CORR1, CORR2) be made thus allowing the instruction key value to be brought to the necessary value whenever a branch-type of instruction is executed. Since the value of the key required to decrypt the callee is known (i.e. $KC_{IN}$) and the value of the key following the execution of the caller is known, it is possible to predict a modification value for each caller, wherein that modification value, when used in the calculation, will bring the instruction key to the required value. The proper modification value is then implemented at each branch-type of in order to make the necessary modification to the instruction key each time this type of instruction is used—a different modification being made per caller. According to an embodiment of the present invention the modification value is introduced as a further operand in the combination of the previous decryption key and the digest of the previous instruction as described above.

As an example of the how the modification to the instruction key described above is made, we consider a jump instruction. In a preferred embodiment of the present invention, a jump instruction comprises a destination parameter, as is usually the case for a jump instruction, and further comprises a modification parameter, e.g. JMP C, #CORR1. The modification value (#CORR1) is then used as an additional parameter in the combination of the previous instruction key and all or part of the previous instruction. It is useful to note that rather than extracting the modification value from the instruction and using it as an extra parameter in the combination step, the digest of the jump instruction could already take the modification value into account. The following table T1 illustrates the state of the instruction keys as the execution of a programme evolves through a modified jump instruction of the type described above. The table includes the value of the key required to decrypt an instruction and the value of the key following the execution of the instruction and the calculation of a new key. Since the value of the key required to decrypt the instruction at label1 is known, it follows that the appropriate correction values, CORR1 or CORR2, can be calculated in order to bring the unmodified values, K4 or K14, to the required value K91.

T1

| Required Key | Label | Instruction | Resulting Key |
|---|---|---|---|
| K1 | | Instruction1 | K2 |
| K2 | | Instruction2 | K3 |
| K3 | | JMP label1, CORR1 | K91 = Fn(K4, CORR1) |
| K11 | | Insruction11 | K12 |
| K12 | | Instruction12 | K13 |
| K13 | | JMP label1, CORR2 | K91 = Fn(K14, CORR2) |
| K91 | label1 | Instruction91 | K92 |
| K92 | | Instruction92 | K93 |

In another embodiment of the present invention, instead of having a modified jump instruction for example, a standard jump instruction is used and the modification to the instruction key described above is done by a dedicated "modifying" instruction with a modification value as a parameter. The function of such a modification instruction is to act directly upon the instruction key based on the modification value. The modifying instruction is placed just before the branch or jump type instruction, thus allowing for the instruction key to be appropriately updated in order to properly decrypt the callee. It is useful to note that the "modification" function as described above may in actual fact be a plurality of instructions which are designed to perform the desired modifying operation on the value of the instruction key. For example, if the value of the instruction key required to properly decrypt the callee is #39, then just before say a jump instruction, there could be an XOR of the instruction key (KI) with #39 to find the modification value (CORR1) and then an add of CORR and KI to give a new (corrected) KI value:

By way of another example, the instruction key at the callee "label1" has the value K91. Due to the fact that the program flow can arrive from different paths, a correction instruction Inst_CORR is added just before the jump so that the instruction key is updated to a predetermined value K90. The execution of the branch-type instruction, which in this case is a jump, will modify the instruction key from K90 to K91. As it is apparent in the table T2 below, the correction value (C1, C2) associated with the correction instruction (Inst_CORR) aims to modify the current instruction key (K3, K13) to the predefined value K90. As a consequence, the execution of the jump will update the instruction key from K90 to K91, the value used to decrypt the instruction at the callee (label1).

In the case that the branch-type instruction has a different value e.g. when the instruction is a short branch BRA, the digest produced by this instruction will be different than the digest produced by the jump instruction. As a consequence, the correction value C3 attached to the correction instruction Inst_CORR should take into account the difference and the instruction key while executing the branch instruction will not be the same as for the jump instruction. However, due to the correction value C3, the final value after the execution of the short branch instruction will still be K91.

T2

| Required Key | Label | Instruction | Resulting Key |
|---|---|---|---|
| K1 | | Instruction1 | K2 |
| K2 | | Instruction2 | K3 |
| K3 | | Inst_CORR, C1 | K90 = Fn(C1, K4) |
| K90 | | JMP label1 | K91 |
| K11 | | Insruction11 | K12 |
| K12 | | Instruction12 | K13 |
| K13 | | Inst_CORR, C2 | K90 = Fn(C2, K14) |
| K90 | | JMP label1 | K91 |
| K20 | | Instruction1 | K2 |
| K21 | | Instruction2 | K3 |
| K22 | | Inst_CORR, C3 | K80 = Fn(C3, K23) |
| K80 | | BRA label1 | K91 |
| K91 | label1 | Instruction91 | K92 |
| K92 | | Instruction92 | K93 |

The following table T3 illustrates the state of, the instruction keys as the execution of a programme evolves through a conditional jump instruction, where two different destinations, label1 and label2, are possible following the execution of the conditional jump. In this case the key required to decrypt the instructions at both destinations should be the same. The table includes the value of the key required to decrypt an instruction and the value of the key following the execution of the instruction and the calculation of a new key.

T3

| Req Key | Lab | Instruction | Res Key |
|---|---|---|---|
| K91 | L1 | Instruction1 | K2 |
| K2 | | Instruction2 | K3 |
| K3 | | CORR = C1 | K90 |
| K90 | | JMP COND L1, L2 | K91 |
| K11 | | Insruction11 | K12 |
| K12 | | Instruction12 | K13 |
| K13 | | JMP L2, CORR2 | K91 |
| K91 | L2 | Instruction91 | K92 |
| K92 | | Instruction92 | K93 |

Another situation where one callee may be referenced by a plurality of callers, thus requiring a modification to be made to the instruction key in order to properly decrypt the callee, is a function call or a subroutine call. Typically, during this type of call, parameters can be passed during the call thereby increasing the number of possible different flows within the function or subroutine and consequently the number of possible outcomes following the execution of the function or subroutine. When such a call is encountered a modification is made to the instruction key so that its state may be known at the beginning of the function or subroutine and a further modification is made upon returning from the call i.e. just before coming out of the function or subroutine.

It is worth noting that in the context of the present invention, the modification as described above could also simply entail a substitution of one key by another key.

As is well known to those skilled in art of data processing, an instruction comprises at least an opcode, defining an operation to be performed. The instruction may comprise no more than this or it may further comprise one or a plurality of operands on which the operation is to be performed. Further to the opcode and the operand or operands if they exist, an instruction may comprise an authentication tag, otherwise known as an integrity figure, which is used as a way of checking the validity of the instruction. Consequently, in another embodiment of the present invention, before the execution of an instruction, the instruction may first be verified using an authentication tag as described above. The authentication tag may take the form of a checksum or a hash value of all or part of the opcode and operand(s). In most cases, the authentication tag may be regarded as a signature of the opcode. In encrypting all or part of an instruction, we are therefore faced with the choice of whether to encrypt just the opcode or the opcode with the authentication tag or to include the operand(s) as well. Any combination of the above will work, however, in cases where it is important to conceal the content of a programme from a third party, the present invention favours encrypting the opcode and the authentication tag, since the authentication tag may give a potential attacker a clue to what the opcode might be. The method used in this embodiment of the present invention therefore comprises reading a current encrypted instruction; using the instruction key to decrypt the current encrypted instruction and the authentication tag; verifying the thus extracted authentication tag; updating the instruction key using a calculation based on the current value of the instruction key (or a digest thereof) and a digest of the current instruction, so that the next encrypted instruction to be read may be decrypted with the updated instruction key; executing the current instruction on condition that the authentication tag was found to be valid. If the authentication tag is not found to be valid, then the programme may be made to terminate gracefully i.e. while generating an appropriate alarm.

Since in some cases where the present invention may be implemented, an objective may not necessarily be to prevent a third party from being able to copy a piece of software but merely to prevent that third party from altering the software without such alteration being detected, one embodiment of the invention exists wherein the opcodes of the instructions are left in clear and only the authentication tags are encrypted. This is sufficient to achieve the goal of guaranteeing software integrity afforded by the invention. Similarly it is possible in another embodiment to encrypt only the operands should they exist. Likewise, encryption of any of opcode, operands or authentication tags or any other combination thereof is possible.

Similarly, in an embodiment of the present invention, it is possible to keep the opcode and operands in clear and to encrypt only part of the authentication tag. In the case of a jump then, instead of using a modification value as described above, it is possible to simply deactivate check of the authentication tag after a jump instruction. The advantage of this solution is that the jump instruction would then not require a modification value.

The present invention therefore provides a solution to the problem of guaranteeing the integrity of software programmes by encrypting all or part of each instruction of a programme using a key based on all or part of one or a plurality of previous instructions, thus resulting in a different encryption key per instruction. The invention is applicable to software programmes whose structures are not necessarily tree-like in nature and is also applicable when the programme includes loops, jumps, calls or breaks etc. The invention allows for an exception to be flagged when an encrypted instruction is wrongly decrypted. The first instruction does not necessarily have to be in clear since the instruction key may be appropriately initialised as required. The invention can be realised in software or entirely in hardware thereby eliminating the possibility of a third party intercepting a decrypted instruction or a decryption key.

The encryption of the instruction can use one of a large range of encryption algorithms such as a stream cipher, a block cipher, a one-time pad, a scrambler such as bit inversion, bit shifting, bit swapping, parity algorithm or cyclic redundancy code for example.

The invention claimed is:

1. A processor-implemented method for ensuring integrity of a software program in a program memory, said software program including a plurality of encrypted instructions, an instruction including a single opcode, said method using an initialized instruction key, said method comprising:
    reading a current encrypted instruction;
    using the instruction key to decrypt at least part of the current encrypted instruction, thereby yielding a current decrypted instruction;
    updating the instruction key using a calculation based on a digest of the current value of the instruction key and a digest of the current decrypted instruction, so that a next encrypted instruction to be read is decrypted with the updated instruction key;
    executing, by the processor, the current decrypted instruction; and
    repeating said reading, using, updating and executing on an instruction by instruction basis.

2. The method according to claim 1, wherein a first instruction in the program memory is not encrypted.

3. The method according to claim 1, wherein the current decrypted instruction further comprises an authentication tag, said authentication tag being used to authenticate said instruction before execution.

4. The method according to claim 1, wherein a modification is made to the instruction key, said modification allowing for the decryption of the next encrypted instruction using said modified instruction key to give an executable instruction.

5. The method of claim 4, wherein the current instruction further comprises a modification value to be used in achieving the modification, said modification value being extracted from the instruction value and acting on the updating step while determining the next encryption key.

6. The method according to claim 1, wherein any or all of the processes of decrypting an encrypted instruction, updating the instruction key, authenticating the current instruction or executing the current instruction are carried out within a security module.

7. The method according to claim 1, wherein said digest is a result of a function applied to all or part of said current instruction, said function being selected from a logical function, an arithmetic function, a cryptographic function or a one-way function.

8. The method according to claim 1, wherein the updating of the instruction key is further based on a modification value, said modification value being used to bring the instruction key to a known value.

9. The method according to claim 1, wherein a master key is used to initialize the instruction key.

10. A device comprising:
    a program counter (PC);
    a program memory (PMEM) for storing an encrypted program, said encrypted program including a plurality of encrypted instructions (INST'), each of said instructions including a single opcode;
    a decryption module (DECR); and
    a data processing unit (SCPU), said device having access to an initialized instruction key (KI), wherein the device is further configured to recursively update the instruction key (KI) based on all or part of said instruction key and a digest of at least one previously executed instruction.

11. The device according to claim 10, wherein recursively updating the instruction key is implemented in hardware.

12. The device according to claim 10 wherein the update of the instruction key is further based on a modification value said modification value being used to bring the instruction key to a known value.

* * * * *